United States Patent [19]

Katz et al.

[11] Patent Number: 5,309,359
[45] Date of Patent: May 3, 1994

[54] METHOD AND APPARATUS FOR GENERATING AND UTLIZING ANNOTATIONS TO FACILITATE COMPUTER TEXT RETRIEVAL

[76] Inventors: Boris Katz, 24A Garden St., Cambridge, Mass. 02138; Patrick H. Winston, 258 Sudbury Rd., Concord, Mass. 01742

[21] Appl. No.: 568,520

[22] Filed: Aug. 16, 1990

[51] Int. Cl.$^5$ .............................................. G06F 15/40
[52] U.S. Cl. ................................................ 364/419.19
[58] Field of Search .......................... 364/419; 385/934

[56] References Cited

U.S. PATENT DOCUMENTS

| | | | |
|---|---|---|---|
| 4,270,182 | 5/1981 | Asija | 364/419 |
| 4,358,824 | 11/1982 | Glickman et al. | 364/419 |
| 5,067,070 | 11/1991 | Miyao et al. | 364/419 |
| 5,140,522 | 8/1992 | Ito et al. | 364/419 |
| 5,148,541 | 9/1992 | Lee et al. | 364/419 |

FOREIGN PATENT DOCUMENTS 0196064 10/1986 European Pat. Off. ............. 395/934

OTHER PUBLICATIONS

Schwartz, "Natural Language Interfaces and Database Expert Systems", Artificial Intelligence & Advanced Comp. Tech. Conf., pp. 425–432, Apr. 1987.
Humphrey et al., "Knowledge Based Indexing of Medical Literature ... ", Journal of Amer. Society for Information Science, pp. 184–196 1987.
Caspir Coded copy of Glickman et al., U.S. Pat. No. 4,358,824, Nov. 1982.
Caspir Computer Aided Searching and Patent Image Retrieval Users Guide, Sep. 1986, pp. 1–22 Plug Icirepat Term List.

*Primary Examiner*—Robert A. Weinhardt
*Attorney, Agent, or Firm*—Wolf, Greenfield & Sacks

[57] ABSTRACT

A method and apparatus for computer text retrieval which involves annotating at least selected text subdivisions, preferably with natural language questions, assertions or noun phrases. However, the annotations may also initially be generated in a structured form. Annotations are, if required, converted to a structured form and are stored in that form. Searching for relevant text subdivisions involves entering a query in natural language or structured form, converting natural language queries to structured form, matching the structured form query against stored annotations and retrieving text subdivisions connected to matched annotations. The annotation process may be aided by utilizing various techniques for automatically or semiautomatically generating the annotations.

48 Claims, 8 Drawing Sheets

METHOD AND APPARATUS FOR GENERATING AND UTLIZING ANNOTATIONS TO FACILITATE COMPUTER TEXT RETRIEVAL

FIELD OF THE INVENTION

This invention relates to systems for retrieval of computer stored text and more particularly to a method and apparatus for annotating stored text, either manually, semiautomatically or automatically and for utilizing the generated annotations to retrieve relevant text.

BACKGROUND OF THE INVENTION

Although computer programs can analyze some simple, isolated sentences in English and other natural languages, computer programs are not likely to be able to understand free-form natural language text for many years. Consequently, there are large bodies of text which are difficult to access and are, therefore, either not utilized at all or significantly under-utilized.

The standard technique for accessing such free-form texts is by means of a "key word" combination, generally with boolean connections between the words or terms. An "inverted" file or key word index may be provided to reduce the time required for such search.

Such key word searching techniques have a number of drawbacks. First, such systems are not adapted to accept a search request in the form which would normally be posed by a user. Instead, the user must be able to determine the terms and the boolean connections which will yield the desired information. Such a procedure requires a certain level of sophistication on the part of the user. Even with a sophisticated and experienced user, because of the vagaries of the natural language utilized, and for other reasons, a search is frequently drawn too broadly so as to yield far more "hits" than the user wishes to review, or is drawn too narrowly so that relevant items are missed. In many instances, a search strategy is evolved by trial and error so that an acceptable number of relevant hits are obtained. While some front end programs are available for assisting a user in developing a search strategy, the use of such front-end programs is also time-consuming and, depending on the skill of the user, may still not result, at least initially, in a proper search strategy being evolved.

A second problem with key word searches is that they in fact require that every word of the text be looked at during a search. Since textual databases such as those containing legal cases, scientific or medical papers, patents and the like may contain millions of words of text, a full key word search can often be a time-consuming procedure. This problem is generally dealt with through use of inverted file indexes which lead a user to an area containing a particular key word so that the entire body of text need not be searched. However, inverted file arrangements are not appropriate in all situations. The basic problem is the size of the inverted index, which can equal, or even exceed, the size of the main document file. Further, in order to maintain the usefulness of the inverted file, it is necessary that the large inverted file of key words be updated each time the main database is updated. For these and other reasons, inverted files are generally appropriate only if:

(1) the vocabulary of the text or database is homogeneous and standardized, as in medicine and law, and relatively free of spelling errors;

(2) contiguous word and word proximity processing (where the location of the search words in the text is important) is not necessary and, hence, extensive location information is not required (i.e. extensive boolean connections between words are not critical in the key word search process);

(3) a limited class of text words (rather than the full text) are used for search purposes so that only these terms need appear in the inverted index;

(4) the database is not too large.

When the criteria indicated above are not met, an inverted file may be of only limited use in reducing the time required for a given search.

Thus, since the quantity of text is ever increasing, it becomes progressively more difficult to rapidly locate relevant text to a particular question, assertion or the like; and it becomes virtually impossible to locate all text relevant to such an item. However, particularly in such areas as law and patents, failure to locate a relevant precedent or patent can have catastrophic results.

Therefore, a need exists for an improved method and apparatus for retrieving relevant text from large databases, and in particular for permitting such retrieval to be accomplished by a relatively unsophisticated user. Preferably, the user should merely be required to present a query in English (or other natural language) in a way which is normal for the user, with little or no preconditions attached.

It should also be possible to complete searches on all types of text, and to complete the search expeditiously. To improve the response time on database searches, it is preferable that it not be necessary to refer to each word of the text during a retrieval operation and it is also desirable that, once relevant text is located, it be possible to locate other relevant text from the initially-located relevant text without necessarily requiring further search of the textual material.

SUMMARY OF THE INVENTION

In accordance with the above, this invention provides a method and apparatus for facilitating computer text retrieval. The basic feature of the invention is that selected subdivisions of the text, such as sentences, paragraphs, sections, chapters, articles, columns, or the like, are annotated, preferably with natural language questions, assertions, or noun phrases. For the preferred form of the invention, the inputs are in a natural language, often the natural language in which the text appears, for example, English, Russian, French, German, etc. The annotations may however also initially be provided in a structured form. The structured form may utilize natural language words, which is the preferred form, or may use an artificial language.

The annotations may be generated manually, semiautomatically or automatically. Where the annotations are generated at least semiautomatically, similarities may be detected between a current text subdivision to be annotated and previously annotated subdivisions; then previous annotations from subdivisions having predetermined detected similarities to the current text subdivision may be utilized to annotate the current text subdivision. The detected similarities may, for example, be key words, noun phrases, or the like. Annotations from a prior text having the predetermined similarities may be modified either automatically or manually so as to be appropriate for the current text. In a semiautomatic mode, the system may propose previous annotations and an operator may select one or more of the proposes annotations which are suitable for use with current text subdivisions.

In another method for the semiautomatic generation of annotations, a database of annotation groups is formed from existing annotated subdivisions. One annotation for a current text is then selected, either by an operator or by some automatic technique, and the database of annotations is then searched for a similar annotation. Other annotations in the annotation group containing a similar annotation to the selected one are then either used or proposed to annotate the current text subdivision.

One or more pointers may be stored with each stored annotation so that, during a search, when an annotation is located, all text relevant to that annotation may be quickly located.

Where the annotations are originally presented in a natural language, they are preferably converted to a structured language form for storage so that, regardless of how the annotations are initally presented, they are always stored in a structured language form. To the extent pointers are not utilized as indicated above, other connections are established between the annotations and the textual subdivisions.

Once the annotations have been stored, relevant textual subdivisions may be located by merely searching the annotations rather than the full text. The queries to the system may be presented as standard natural language queries which the system then converts to the structured form for purposes of performing an annotation match. The ability of the system to convert a broad range of natural language queries into a form which may be matched with annotations stored in a structured form permits searches for relevant text to be easily performed by unsophisticated users without requiring the storage of excessive material.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
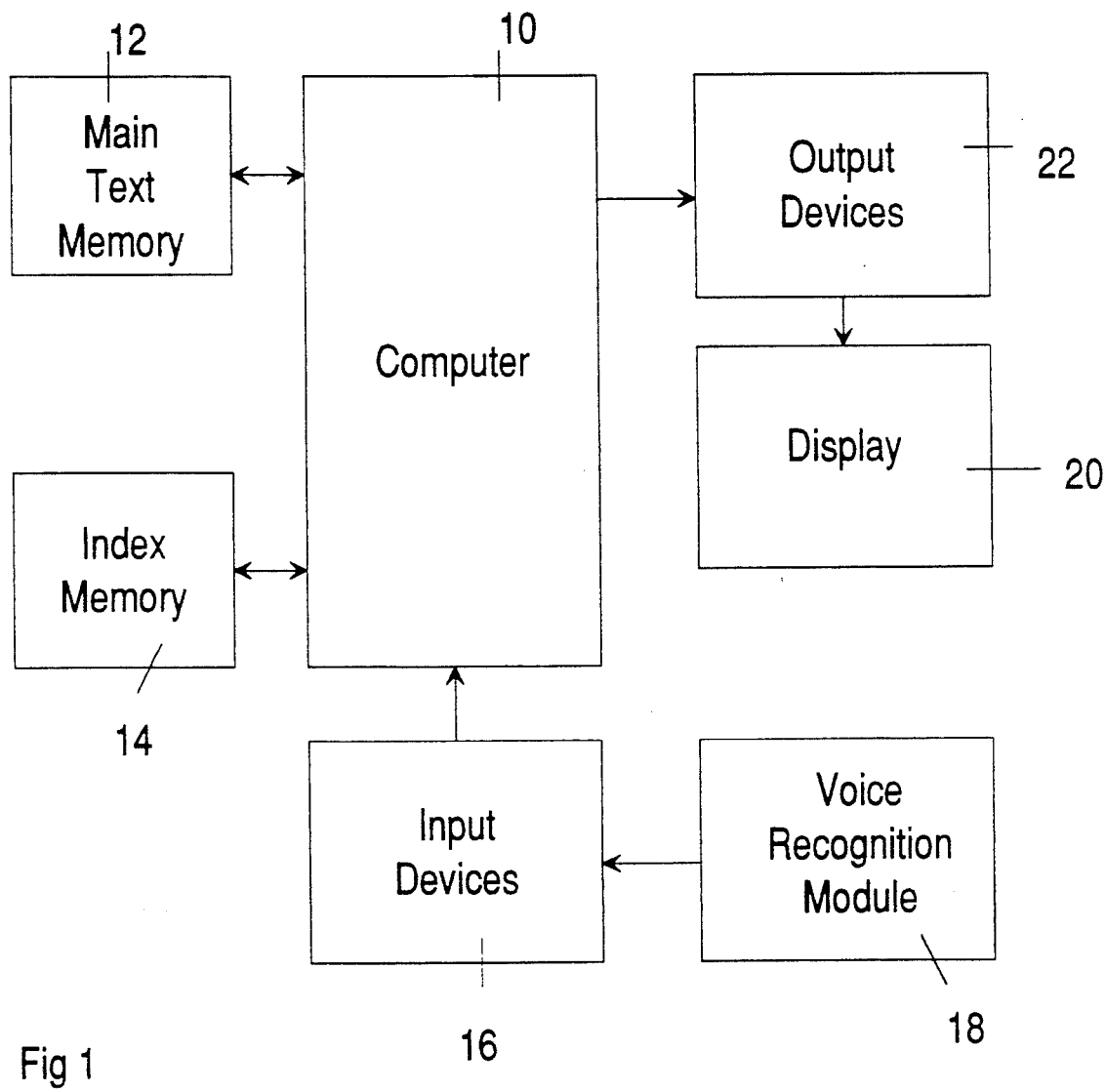
FIG. 1 is a block diagram of exemplary system in which the teachings of this invention might be utilized.

As previously indicated, this invention relates to facilitating the searching of a large database of textual material, for example, all legal cases from a particular court or from courts in a particular geographic area, to find portions or subdivisions of the text which are relevant to a particular query. For purposes of this invention, a query may be a question (for example, "What is Neptune's color?"), an assertion (for example, "Neptune is blue"), or a noun phrase (for example, "the color of Neptune").

In order to facilitate the retrieval of relevant material from the textual database, at least selected subdivisions of the database are annotated. The annotations can also be in the form of questions, assertions or noun phrases. As will be discussed in greater detail later, the annotations can be manually generated, semiautomatically generated or automatically generated. The subdivisions to be annotated may all be of the same type, for example paragraphs, or may vary depending on information content. Thus, where an entire article or paper is relevant to only a single query, only a single annotation might be utilized for the entire article or paper. However, in other situations, annotations might be appropriate for each paragraph, for selected paragraphs or even for sentences within a paragraph. Depending on the text, the subdivisions utilized for annotation purposes might include sentences, paragraphs, sections, columns, articles, papers, chapters and the like.

The annotations are stored in an annotation memory with suitable pointers or other connectors to the relevant text. When an annotation previously stored is found to be relevant to another piece of a text subdivision, additional pointers may be added to the annotation so that when the annotation is matched during a search, both pieces of relevant text will be retrieved. There is no limit on the number of pointers which may be associated with a given annotation, although the memory utilized may impose some practical limitations. There is also no limit to the number of possible annotations for a given text subdivision.

Annotations may be generated in a natural language or may initially be generated in a structured form. For purposes of this invention a natural language will be a language such as English, French, German, Japanese or the like which is normally spoken in some part of the world. While for most of the examples, the natural language utilized is English, this is not a limitation on the invention. Further, while in the preferred embodiments the annotations are in the same language as the text, in some situations it may be desirable to have annotations in a different natural language from that of the text being annotated. This might be useful, for example, in retrieving documents in a foreign language that have not yet been translated into the language of the person looking for text. Thus, selective translation would be made only of relevant text. This would also be useful, for example, if the person looking for text is different from the person who will read the retrieved text or if the person looking for text is only minimally competent in the foreign language. A structured form is a more stylized form of the initial query which may, for example, be more useful for pattern matching purposes.

Thus, for example, a plurality of different queries such as "What is Neptune's color?", "What color is Neptune?", "What is the color of Neptune?", "What color is Neptune's atmosphere?", "What color is the atmosphere of Neptune?" and "What is the color of Neptune's atmosphere?" might correspond to just two structured forms (color Neptune?) and (color (possessive Neptune)?). Thus the structured form annotations for a subdivision of text that includes the sentence "Neptune's atmosphere is blue." might include (color Neptune blue) and (color (possessive Neptune) blue). Note that a single subdivision of text can have any number of structured form annotations.

The stored text may be searched by searching the annotations in structured form. When a matching annotation is located, all text relative to the matched annotation may be retrieved. Searching may be done by relatively unsophisticated users since the queries may be presented as normal English questions or assertions. Such normal English questions or assertions are then converted to structured form for searching and match.

Referring to the figures for a more detailed understanding of the invention, FIG. 1 shows a system which might be utilized to practice the teachings of this invention. The system includes a computer 10 which may be any of a variety of standard data processors available on the market. The size of computer 10 may vary to some extent with the size of the database being accessed, on other functions which may be required of the processor and on the speed required to perform the various operations. While for purposes of the following discussion it is assumed that the same computer 10 is being utilized both to generate the annotations and to search the text, this is by no means a limitation on the invention, and different processors might be utilized to perform these functions.

Computer 10 has at least one large capacity memory 12 in which the textual database to be searched is stored. Memory 12 may be any of a variety of existing, large capacity memories such as various disk drives. Computer 10 may also have an additional memory device 14 in which annotations in structured form are stored. Depending on the size of the main database, memory 14 may also be of considerable size. Memories 12 and 14 may be separate storage devices or may be various sections of the same storage device.

A number of standard input devices 16 may be available for providing information to computer 10. These may include, but are by no means limited to, keyboard devices, mouse or roller ball inputs and the like. One option available with this system is to include a voice recognition module 18 which may be utilized to input annotations or to input queries into the system. Voice recognition module 18 may be any of a variety of such modules currently available, and is preferably one which may be trained to recognize the voice of a particular individual doing annotations.

Finally, computer 10 may have a number of standard output devices 22 such as a cathode ray tube display 20, a printer, a voice synthesizer, etc. A user may be able to interact with display 20 by use of one of the input devices 16 to, for example, select annotations from a group of proposed annotations and/or for other purposes.

Figure 2:
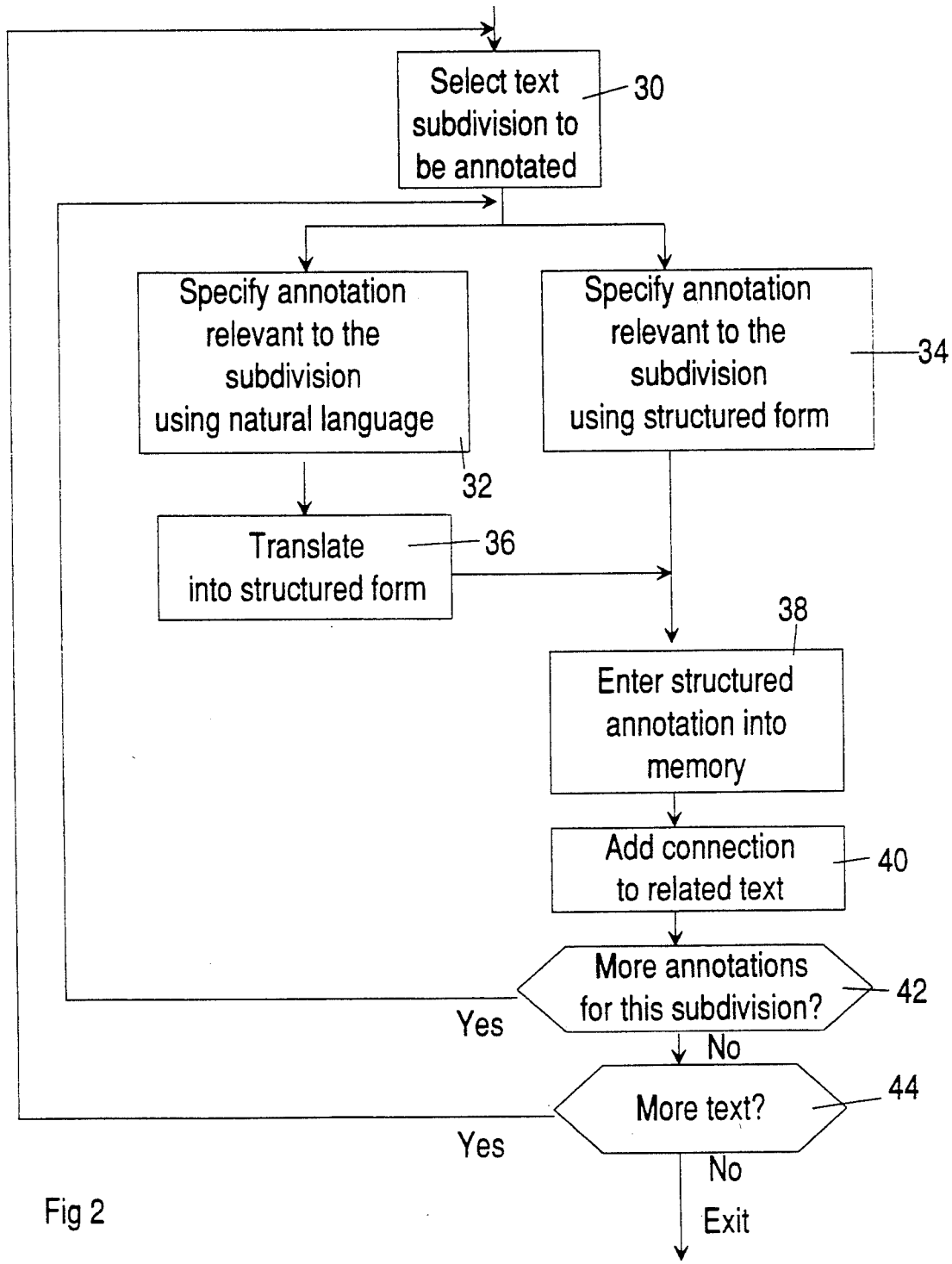
FIG. 2 is a general flow diagram of the annotation generating process for a preferred embodiment of the invention.

FIG. 2 illustrates the general procedure utilized to annotate text in accordance with this invention. The first step in the operation, step 30, is to select a text subdivision to be annotated. As previously indicated, this may be any logical subdivision of the text from a sentence up through an entire article or book. Typically, textual subdivisions for purposes of annotation might be a paragraph or section of a document. The decision on the subdivisions to be annotated would normally be made by a person doing the annotation who would read the text and decide on logical groupings of text with respect to a particular annotation. It is possible that a single piece of text might be relevant to two separate annotations. Thus, with three successive paragraphs, paragraphs 1 and 2 might be relevant to a first annotation while paragraphs 2 and 3 are relevant to a second annotation. Paragraph 2 would thus be part of the subdivision for both annotations.

While in the discussion above, it is assumed that step 30 is performed manually, it is, of course, possible that this step could also be performed automatically. Thus, for example, a decision could be made that an annotation would be provided for each paragraph, thus removing the human decision making process. However, such a simplistic mechanical approach might result in annotations being generated for paragraphs which do not provide useful information and in perhaps a single annotation being generated for a paragraph which might be relevant to two or more queries. While more sophisticated subdivision generation algorithms can be envisioned, human decision in this process appears preferable at this point.

Once step 30 has been completed, the operation proceeds to either step 32 or 34, depending upon whether annotations are initially generated in English (or other natural language) or in a structured form. Assuming annotations are initially generated in a natural language, for example, as a question, assertion or noun phrase, the operation would proceed to step 32 during which an annotation for the text subdivision would be generated. This annotation could be generated by a person utilizing a keyboard or other input device 16 to generate the annotation. Since generating annotations is a labor intensive task, it might be faster to permit the annotator to orally input annotations using the voice recognition module 18, with the module converting the oral input to machine readable form which is inputted to computer 10.

It is also possible that step 32 may be performed either semiautomatically or automatically. Ways in which automatic or semiautomatic generation may be performed are discussed later. Generally, these techniques involve finding some relationship between the current text subdivision and a prior text subdivision and either utilizing the annotations for the prior text subdivision, as suitably modified for the current text subdivision (automatic mode); or displaying the modified annotations to the annotator as proposed annotations with the annotator making selections from the proposals (semiautomatic operation).

When an annotation has been presented to or generated by computer 10 during step 32, the operation proceeds to step 36 during which the annotation, which is still in natural language form, is translated into a structured form. As previously discussed, the structured form is an artificial language which may still use natural language words or may be in pure code. Examples of structured form might be, for example, a T-expression discussed in chapter 6 of ARTIFICAL INTELLIGENCE AT MIT - EXPANDING FRONTIERS, edited by Patrick H. Winston with Sarah A. Shellard (the MIT Press). Various pattern matching languages or relational database forms may also be utilized to perform this function. Examples of such language are provided in LISP, 3rd Edition, P. H. Winston and B. K. P. Horn, Addison-Wesley Publishing, 1989, Chapters 24, 28, 29 and 30 being of particular interest. A preferred procedure for the translation of natural language to structured form (i.e. a natural language interface) is described in Chapter 6 of Artificial Intelligence at MIT-Expanding Frontiers. Other natural language interface programs and procedures are also known in the art.

This translation procedure means that a set of annotations expressed in natural language may correspond to a smaller number of annotations in structured form, thus facilitating searching. The inputs from the annotator might, for example, be in the following forms:

1. What is Neptune's color?
2. What color is Neptune?
3. What color is Neptune's atmosphere?
4. Neptune is blue.
5. Neptune's atmosphere is blue.
6. Neptune's color.
7. The color of Neptune's atmosphere.

On the above list, Items 1–3 are questions, Items 4 and 5 assertions and Items 6 and 7 noun phrases. It is clear that this is by no means an exhaustive list of the various questions, assertions, noun phrases or the like which might arise from a paragraph describing that Neptune's color appears to be blue because this is the color of its atmosphere. All of the various possible annotations described above might reduce to one or more structured form phrases such as the following:

1. (Color Neptune?)
2. (Color (possessive Neptune atmosphere)?)
3. (Color Neptune blue).
4. (Color (possessive Neptune atmosphere) blue)

Step 34 indicates that the annotation may initially be presented by the annotator in structured form. While presenting annotations in this form is within the contemplation of the invention, and a skilled annotator might not find this difficult to do, particularly with voice input, it may be faster and result in better annotated text if the annotator inputs are in natural language rather than structured form.

Either from step 34 if the input is in structured form or from step 36 if the initial input is in natural language, the operation proceeds to step 38 during which the annotation in structured form is stored in memory 14. During step 38, a single annotation in structured form would typically be stored. However, if two or more annotations in structured form are generated during step 36, these would be stored during step 38.

From step 38, the operation proceeds to step 40 during which a connection to related text is added to the annotation stored in memory 14. This connection might, for example, be a pointer to the memory location in memory 12 at which the related text is stored.

While not specifically shown in FIG. 2, step 38 might also include the step of checking memory 14 to determine if an annotation in the structured form which is the same as the annotation being provided from step 34 or 36 is already stored in memory 14. If the annotation is already stored, then it would not normally be stored again, but would merely have an additional pointer added to the existing annotation during step 40. However, in some instances, it may be required to store an annotation more than once in memory 14 and to chain the two entries together.

When step 40 has been completed, the operation proceeds to step 42 to determine if there are more annotations for the particular subdivision. If there are more annotations for the particular subdivision, the operation returns to perform either step 32 or 34, as appropriate, and steps 32–40 are repeated until, during step 42, it is determined that all annotations for a particular subdivision have been entered. When this occurs, a "NO" output is obtained during step 42, causing the operation to proceed to step 44 to determine if there is more text to be annotated. If there is more text to be annotated, the operation returns to step 30 to select a new text subdivision to be annotated. When during step 44 it is determined that there is no more text to be annotated, a "NO" output is obtained during step 44, causing computer 10 to exit from the annotation routine.

Figure 3:
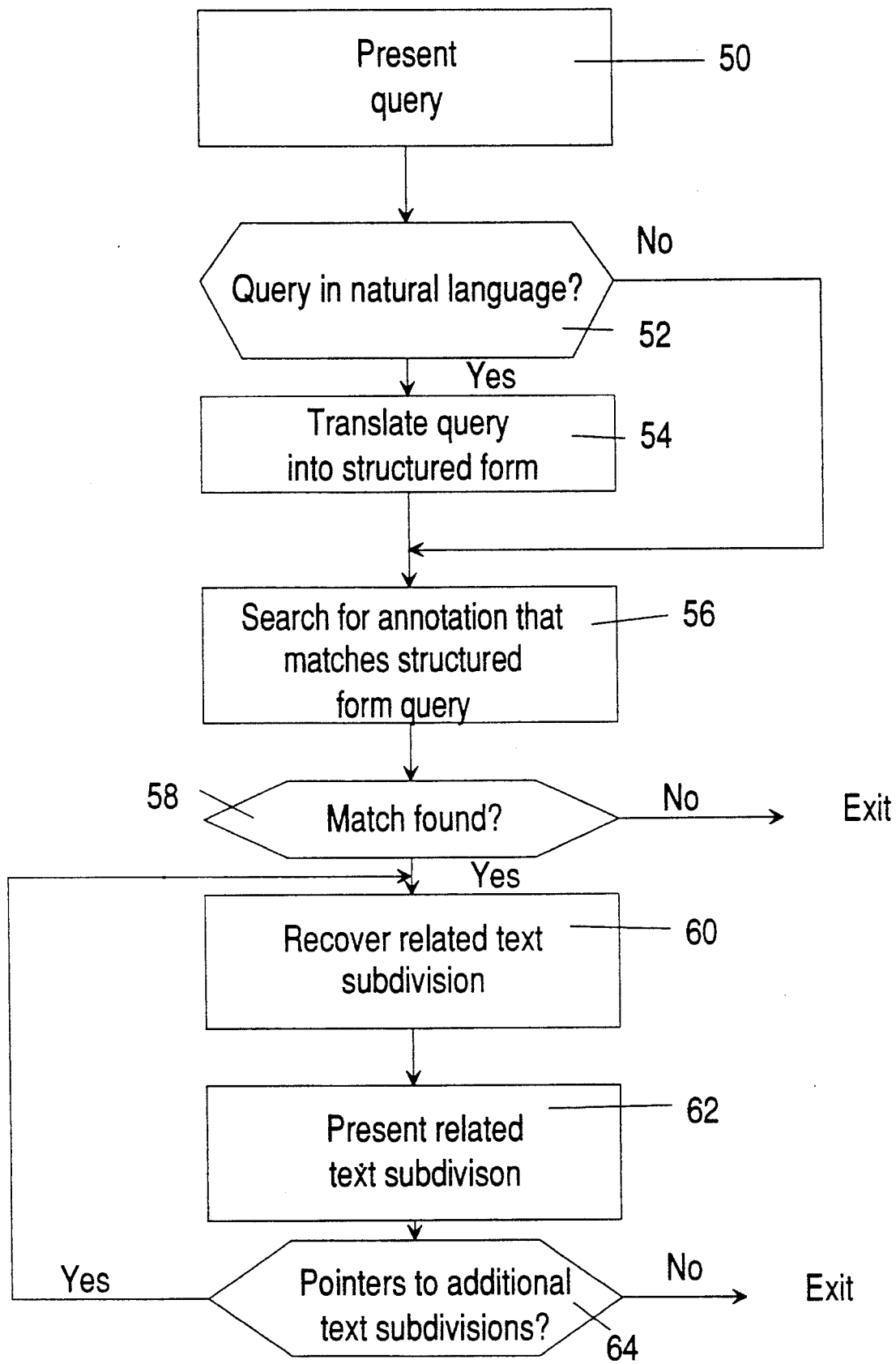
FIG. 3 is a flow diagram of a process for recovering relevant text utilizing the teachings of this invention.

FIG. 3 is a flow diagram of the retrieval mechanism utilizing the teachings of this invention. During step 50, the first step in this operation, a query is presented to the system. This may be done using a standard input device 16 such as a keyboard or using voice recognition module 18. From step 50, the operation proceeds to step 52 to determine if the query is in natural language or structured form. Typically, the query would be by a relatively unsophisticated use and would be in natural language resulting in a "YES" output during step 52. This causes the output to proceed to step 54 during which the query is translated into structured form using the same technique that was used to translate an annotation in natural language into structured form during step 36 (FIG. 2). If, because of limitations on the translation procedure, the query cannot be translated into structured form, the user could be provided with an indication that his query could not be translated into structured form. The user might then be asked to restate the query, perhaps in a simpler form. Alternatively, other retrieval schemes, such as key word analysis, could be tried, either initially or after a second query attempt by the user.

From step 52 if a "NO" output is obtained during this step or from step 54, the operation proceeds to step 56 to search for an annotation that matches the structured form query. Step 56 may be performed by means of a number of known routines which automatically search for similar or identical expressions, such as, for example, pattern match or a relational database operation described in the Winston & Horn book mentioned earlier. During step 58, a determination is made as to whether a match has been found. If a match is not found, the retrieval routine of FIG. 3 would be exited.

At this point, the user could be provided with an indication that relevant information to the query could not be located in the database and/or other retrieval schemes, such as key word analysis, could be tried. If a match is found during step 58, the operation proceeds to step 60 to use a pointer stored with the matched annotation to recover a related text subdivision from main text memory 12. The retrieved text subdivision is then presented to the user during step 62, for example, by being displayed on display 20 or being printed out on an output device 22, or outputted by a speech synthesis system.

While step 62 is being performed, or thereafter, the operation proceeds to step 64 to determine if there are additional pointers stored with the matched on annotation. If there are additional pointers, the operation returns to step 60 to recover the additional related text subdivisions and to step 62 to present such text subdivisions. This sequence of operations continues until, during step 64, it is determined that there are no pointers to additional text for the matched annotation. This results in a "NO" output during step 64 which causes the system to exit from the retrieval mechanism until a new query is received.

As was discussed earlier, in order to achieve the benefits of this invention, it is necessary to annotate text. Particularly for an existing database which contains large amounts of information, this can be a time-consuming, labor-intensive task. While the ability to present the annotations in natural language form means that the annotator may be a semiskilled individual, the annotator still needs to be someone who is sufficiently familiar with the text being annotated so that he can determine the query or queries to which the text is relevant and generate appropriate annotations. The remainder of the discussion is on ways to speed up and simplify the annotation task by permitting it to be accomplished either automatically or semiautomatically. In particular, this is accomplished by utilizing previous annotations to facilitate future annotations as the annotated text accumulates.

One technique for the automatic or semiautomatic annotation of text is illustrated in FIGS. 4A and 4B. As was discussed earlier, a number of different annotations might be utilized for a given text subdivision. Such a set of annotations, which may be questions, assertions, noun phrases or the like are referred to as an annotation group. When there are multiple annotations for a given text item, these annotations are formed into an annotation group. These annotations may be stored together as a group or pointers or other means might be provided to chain the annotations of a group together. Chaining may frequently be required since a single annotation may be part of two or more different annotation groups. Such chaining may, for example, be accomplished by augmenting each annotation with a pointer or pointers to each annotation group that it is a part of. The operation just described is illustrated by box 70 in FIG. 4A.

When an annotation operation is being performed during step 32 (FIG. 2), the operations of FIG. 4B are performed. The first of these steps, step 74, is for the annotator to select one annotation for the text subdivision being annotated. The operation then proceeds to step 76 during which the annotations stored in memory 14 are searched to find an annotation which is the same or similar to the inputted annotation. If an annotation which is the same or similar has been used before, the pointers attached to that indexed annotation are used to find the annotation group that the matched annotation belongs to. The other annotations in those annotation groups may then b retrieved.

In the discussion so far, it has been assumed that annotations are stored in memory 14 basically in the order in which they are received. While this is one possible way in which the annotations may be stored, the searching of annotations may be facilitated if the annotations are indexed in some systematic way. Examples of ways in which annotations may be indexed include arranging the annotations alphabetically by the first word of the structured form annotation or utilizing other known indexing structures. For indexing techniques, see for example Chapter 14, *Artificial Intelligence Programming*, First Edition, CHARNIAK ET AL. ERLBAUM 1980. With indexing, pointers to related annotations or annotations of a particular annotation group would almost surely be required.

There is also a question as to how "similar" is determined during step 76. Generally, this means similar in form, but with different objects. Annotations in similar form with different objects might be considered "similar" if the objects are drawn from the same class. Thus, for example, (color Neptune?) is similar to (color Pluto?) because Neptune and Pluto both belong to the "planet" class. While (color sun?) is also similar to (color Neptune?), it is less similar than (color Pluto?) because the most specific class to which the objects belong is neither planet nor star, but rather the "heavenly body" class, which is a super class of both planet and star. As will be discussed later, these might initially be considered to be sufficiently similar for purposes of step 76, but this decision may later be changed. Alternatively, a search for annotation groups which are "similar" during step 76 might initially look only for annotations which belong to the same specific class, such as "planet". If an insufficient number of new annotations are found with that meaning of "similar", then the objects might be allowed to belong to more remote classes, such as the "heavenly body" class. Some trial and error may be required with a given database in order to achieve the right level of specificity in classes for purposes of "similar" during step 76.

From step 76, the operation proceeds to step 78 to suitably modify the annotations which were found during step 76. "Modify" means that the objects in the stored annotation group are replaced, preferably automatically, by the corresponding object in a new annotation for the new piece of text. Thus, the substitutions used when looking for "similar" annotations are reversed when "modifying" annotations. In other words, if the annotation (color Neptune?) is located when a search is being made for information relating to the planet Pluto, the located annotation would automatically be changed to read (color Pluto?) during step 78.

From step 78, the operation proceeds either to step 80 or step 82. During step 80, the other annotations in the annotation group as modified are stored to be used as annotations for the new text subdivision. This is a more or less fully automatic mode of operation.

Alternatively, during step 82, the other annotations from the annotation group or groups, as modified, are proposed for use to annotate the current text subdivision. Such proposal might, for example, be accomplished by presenting such annotations on display 20. The annotator could then, by means of a keyboard, mouse, rollerball, light pen, voice recognition system or other suitable input means, select from the proposed annotations the ones which are appropriate for the current text subdivision (step 84). The accepted annotations would then be stored during step 38 (FIG. 2) and connections to related text added during step 40.

Figure 5:
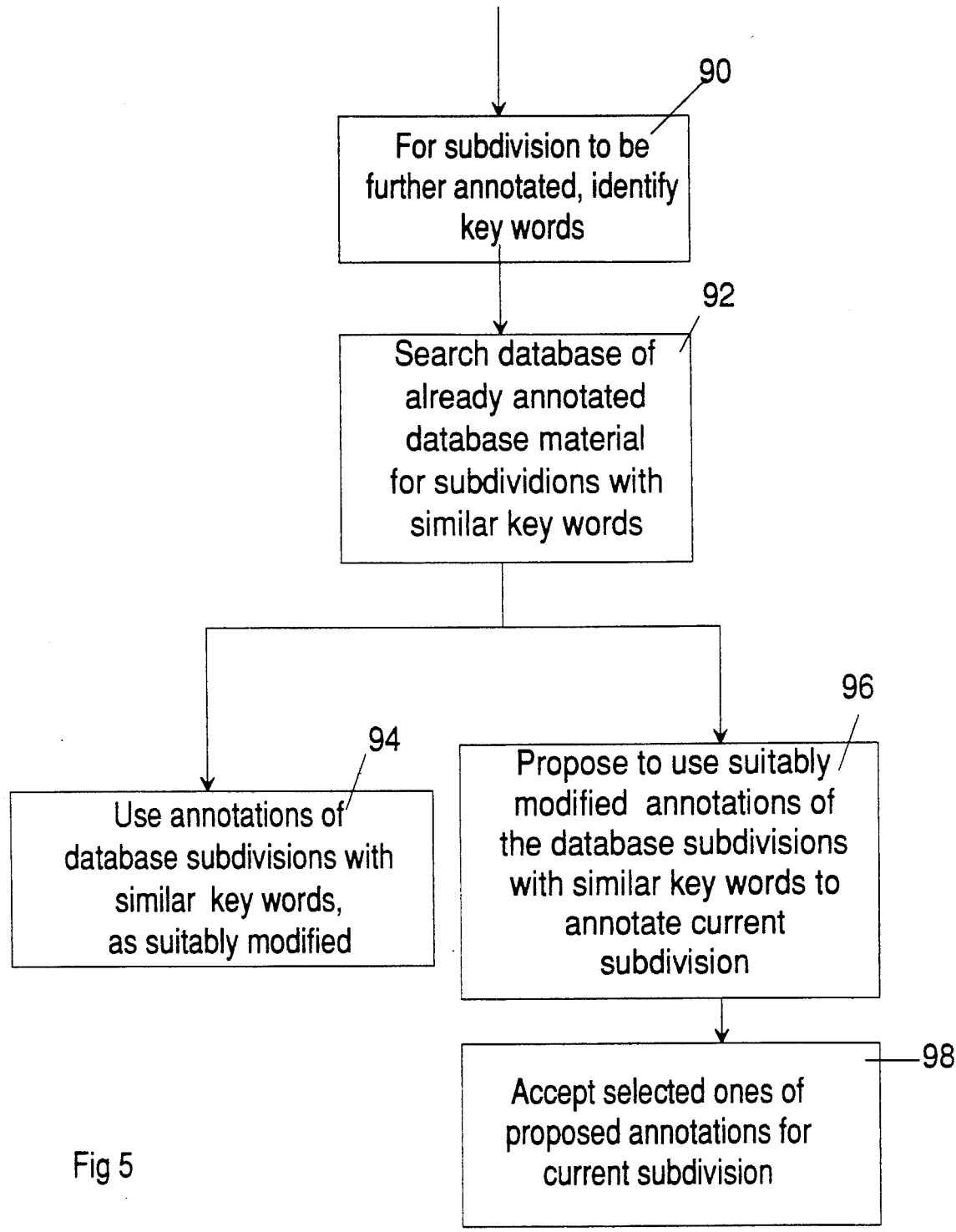
FIG. 5 is a flow diagram of an alternative annotation support mechanism.

FIG. 5 illustrates another way in which annotations might be automatically or semiautomatically generated. Referring to FIG. 5, during step 90, for a text subdivision to be annotated or further annotated, key words are identified. Step 90 may be accomplished in a number of ways. It may be accomplished automatically by, for example, identifying words in the text subdivision which match a list of specified key words. It may also be done manually by, for example, asking a human annotator to supply key words from a text subdivision. Finally, it may be done semiautomatically by, for example, asking a human analyst to select from a list of words identified in the text by a language analysis program. The possible key words could be presented to the annotator by a menu, or highlighted in mouse sensitive text. Other techniques known in the art for identifying key words in text might also be utilized.

When step 90 is complete, the operation proceeds to step 92 during which the text database stored in memory 12, which database has already been annotated, is searched for subdivisions with similar key words. "Similar" during this step can mean similar according to a variety of similarity measures, some of which are presented in an article entitled "Automatic Information Retrieval" by Gerard Salton in IEEE Computer, September 1980, pp 41-56. Systems for determining such similarities of key words are known in the art.

When a section of text having "similar" key words is located during step 92, the operation proceeds either to step 94 or 96. During step 94, the annotations for the text that exhibit similar key words are suitably modified, for example, manually, and the modified annotations are then utilized for the new text subdivision.

Figure 4:
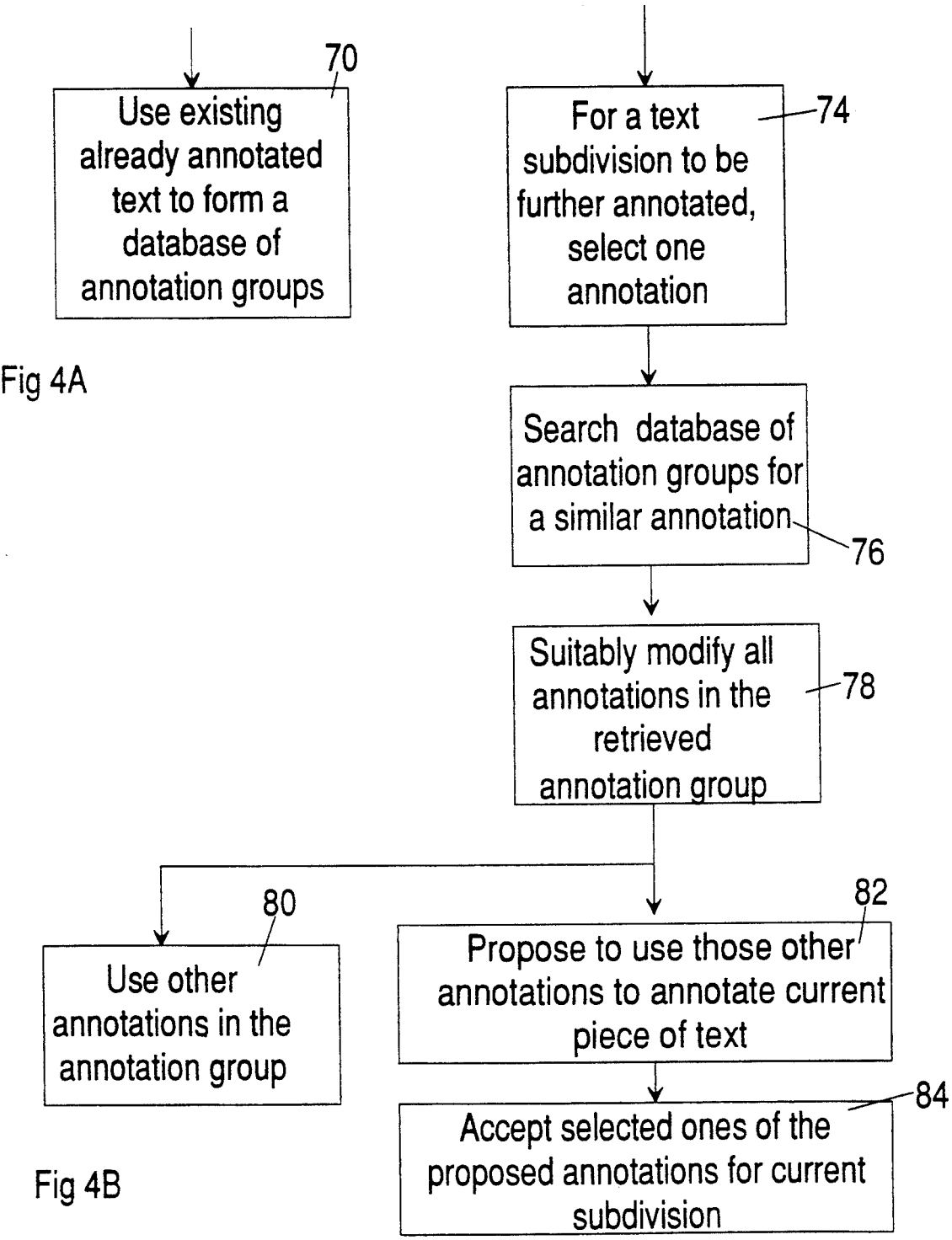
FIGS. 4A and 4B are flow diagrams of a database generating process and a database utilizing process for supporting the automatic or semiautomatic generation of annotations.

Alternatively, during step 96, the same annotations are retrieved and modified in the same way; however, the modified annotations are then proposed for use to annotate the current text subdivision in much the same way that annotations were proposed for use during step 82 (FIG. 4).

From step 96, the operation proceeds to step 98, during which selected ones of the proposed annotations are accepted by the annotator for use for the current subdivision. This step is basically the same as step 84 in FIG. 4B.

Figure 7:
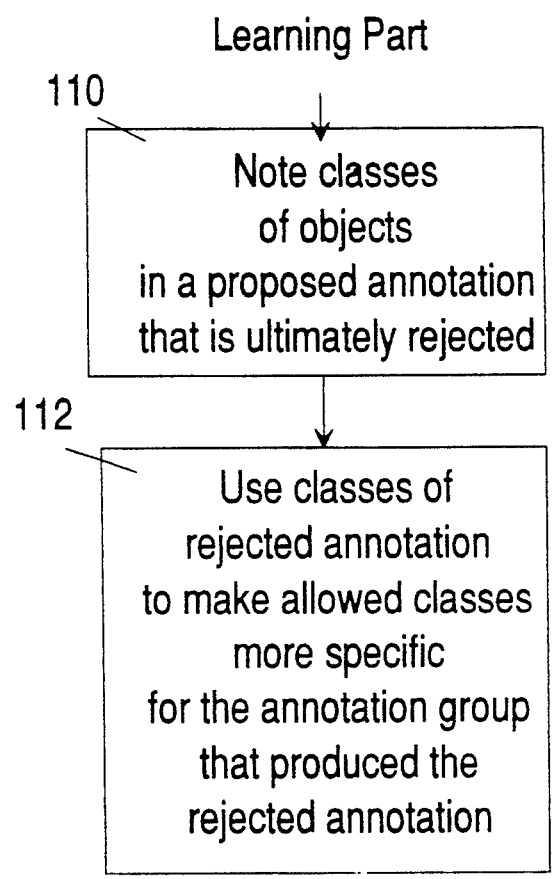
FIG. 7 is a flow diagram of a learning mechanism which might be utilized in conjunction with the various automatic or semiautomatic annotation methods to reduce the number of inappropriate annotations used or proposed for use by use with such methods.
Figure 8:
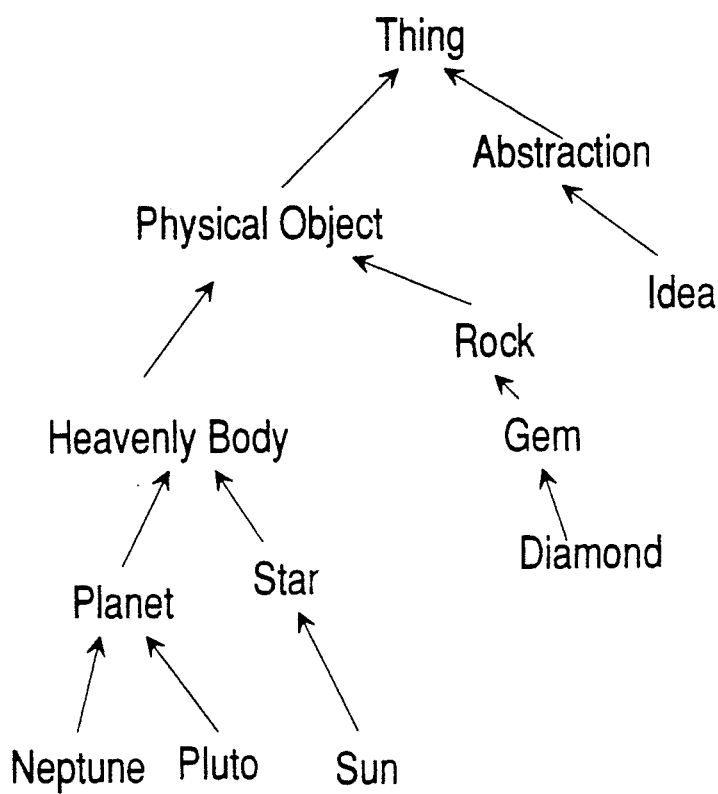
FIG. 8 is a simplified example of a classification tree which might be utilized in conjunction with the learning mechanism of FIG. 7.

It is probable that, at least initially, the various automatic or semiautomatic annotating mechanisms discussed above, or other automatic or semiautomatic annotation techniques will provide or propose a number of inappropriate annotations. The filtering scheme of FIG. 6 and the learning scheme of FIG. 7 are intended to reduce and eliminate as many inappropriate proposed annotations as possible. The general idea is to restrict the use of an annotation group to annotations whose objects fall into particular classes. Class may be determined from a classification tree such as that shown in FIG. 8. This tree is obviously cursory and the tree formed for a particular database would be more extensive, although perhaps less inclusive. Definitions for such a tree could be, for example, taken from a dictionary and entered into the system manually, semiautomatically or automatically. Thus, a code could be stored with each annotation group specifying the classes of objects that limit the application of the annotation group. For example, an annotation group involving the planet Neptune might be restricted to the class "planet," or to the class "heavenly body," While it might be possible to restrict this annotation group to a higher item on the tree, for example, "physical object," this would almost surely result in many inappropriate annotations being utilized or proposed.

Figure 6:
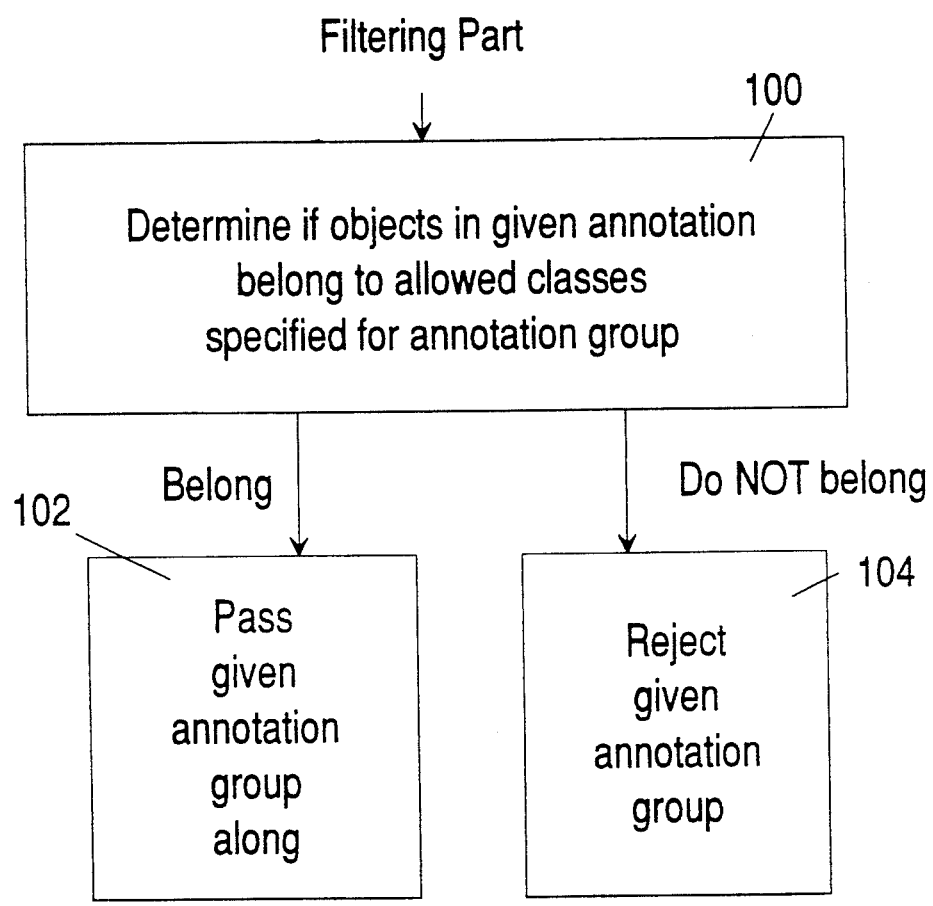
FIG. 6 is a flow diagram of a filtering process which might be utilized to reduce annotations either used or proposed for use in connection with an automatic or semiautomatic annotation generating mechanism.

Referring to FIG. 6, during step 100, a determination is made if objects in a given annotation, obtained from the annotator in step 74, belong to the allowed classes specified for the annotation group obtained in step 76 (i.e. the objects for the current annotation are included within the allowed classes for the annotation group). If the objects do belong to those allowed classes, then the annotation group passes the filtering step and the annotations in that annotation group, as suitably modified in step 78, are either accepted or proposed as annotations for the new text subdivision (step 102). If the objects do not belong to those allowed classes, then the annotation group is rejected (step 104) and its annotations, therefore, are not used or proposed. A similar filtering technique could be utilized for other automatic o semiautomatic annotation techniques.

FIG. 7 illustrates how the filtering step ma be improved based on decisions made by the annotator during, for example, step 84 or 98 where the annotator selects appropriate annotations from a proposed group. Thus, during step 110, the classes of objects in a proposed annotation that is ultimately rejected during step 84 or 98 is noted. During step 112, the classes of rejected annotations are utilized to make allowed classes more specific for the annotation group that produced the rejected annotation.

Thus, if the code in an annotation group limits the annotation group to the "heavenly body" class, and it is found that annotations involving the sun or other stars are rejected (step 104) when proposed in connection with that annotation group, then the code limiting that annotation group could be modified to limit the annotation group to the class "planet," which appears underneath the class "heavenly body" in the tree. This would reduce the likelihood of inappropriate future annotations being used or proposed.

A method and apparatus is thus provided which permits large databases to be accessed by relatively unsophisticated users by the user posing a query to the system in normal natural language. The system can then access text subdivisions relevant to the user's query and, if the original annotating has been done properly, all text subdivisions relevant to the query will be presented.

While the system requires a relatively time-consuming initial annotating process, this process needs to be performed only once for a given piece of text and, once a substantial database of annotations has been developed, it will be possible to perform the annotating process at least semiautomatically and possibly totally automatically. A powerful tool for enhancing the accessibility and usefulness of large databases is thus provided. The technique might also be used for "triggering," with new annotations being examined as they are made to determine if the corresponding text is relevant to a standing query.

While an exemplary system has been shown in FIG. 1 and exemplary annotating and retrieval techniques have been shown in the remaining figures, it is to be understood that this hardware and these techniques are shown for purposes of illustration only and that other hardware or other techniques could be utilized while still remaining within the spirit and scope of the invention. In particular, while two techniques have been described above for performing automatic or semiautomatic annotating, it is within the contemplation of the invention that other techniques for performing these functions might also be utilized.

Thus, while the invention has been particularly shown and described above with reference to preferred embodiments, the foregoing and other changes in form and detail may be made therein by one skilled in the art without departing from the spirit and scope of the invention.

What is claimed is:

1. A method for facilitating computer text retrieval comprising the steps of:
   selecting subdivisions for the text;
   generating for each of said subdivisions which is to be recovered at least one annotation containing words having a selected annotator determined relationship and being in a language selected from the group of a natural language and an artificial language;
   storing the annotations in a predetermined structured form which retains said selected relationship, the stored annotations being readable by a computer to search for desired annotations; and adding to the stored annotations a connection to corresponding text.

2. A method as claimed in claim 1 wherein said generating step includes the step of generating said annotations in said structured form.

3. A method as claimed in claim 1 wherein said generating step includes the step of generating said annotations in a natural language; and wherein said storing step includes the step of translating the annotations in natural language to said predetermined structured form.

4. A method as claimed in claim 3 wherein the natural language for said annotations is different than the natural language of said text.

5. A method as claimed in claim 1 wherein at least some of said annotations are in the form of questions.

6. A method as claimed in claim 1 wherein at least some of said annotations are in the form of assertions.

7. A method as claimed in claim 1 wherein at least some of said annotations are in the form of noun phrases.

8. A method as claimed in claim 1 wherein said generating step includes the step of generating annotations at least semi-automatically.

9. A method as claimed in claim 8 wherein the semiautomatic generating step includes the steps of detecting similarities between a current text subdivision to be annotated and previously annotated subdivisions; and utilizing previous annotations from subdivisions having predetermined detected similarities to the current text subdivision to annotate the current text subdivision.

10. A method as claimed in claim 9 wherein the detected similarities are key words.

11. A method as claimed in claim 9 wherein said utilizing step includes the step of suitably modifying the previous annotations.

12. A method as claimed in claim 11 wherein said utilizing step includes the steps of proposing the previous annotations, and selecting one or more of the proposed annotations which are suitable for use with the current text subdivision.

13. A method as claimed in claim 8 including the step of forming a database of annotation groups from existing annotated subdivisions; and wherein said semi automatic generating step includes the steps of selecting one annotation for a current text to be annotated, searching said database for a similar annotation, and utilizing other annotations in the annotation group containing a similar annotation to also annotate the current text subdivision.

14. A method as claimed in claim 13 wherein said forming a database step includes the steps of storing annotations used, and storing for each annotation a pointer to each group to which the annotation belongs.

15. A method as claimed in claim 13 wherein said utilizing step includes the step of suitably modifying said other annotations.

16. A method as claimed in claim 13 wherein said utilizing step includes the steps of proposing the other annotations, and selecting one or more of the proposed annotations which are suitable for use with the current text subdivision.

17. A method as claimed in claim 8 including the step of filtering annotations which are generated at least semiautomatically to utilize only generated annotations which are appropriate to the current text.

18. A method a claimed in claim 17 wherein said semiautomatic generating step includes the step of utilizing prior stored annotations to annotate the current text; and wherein the filtering step includes the step of storing allowed object classes with annotations, and utilizing a prior annotation for the current text only if the allowed object class for such prior annotations corresponds in a predetermined way to an object for the current text.

19. A method as claimed in claim 18 wherein said utilizing step includes the steps of proposing prior stored annotations related in a predetermined way to the current text for use with the current text; and including the steps of noting object classes for proposed annotations that are not accepted, and using classes of rejected annotations to make allowed object classes for at least related annotations more specific.

20. A method as claimed in claim 1 wherein said storing step includes the step of storing with each annotation one or more pointers for text subdivisions to which the annotation is relevant.

21. A method as claimed in claim 1 including the step of searching stored annotations to find relevant text subdivisions.

22. A method as claimed in claim 21 wherein said searching step includes the step of presenting a search input in structured form, matching the structured form search input to the annotations stored during said storing step, and presenting text subdivisions connected to matching annotations found during said matching step.

23. A method as claimed in claim 21 wherein said searching step includes the steps of presenting a natural language search input, translating the search input into said predetermined structured form, matching the structured form search input to the annotations stored during said storing step, and presenting text subdivisions connected to matching annotations found during said matching step.

24. A method as claimed in claim 21 including the steps of storing a standing query, and examining new stored annotations to determine correspondence to said standing query.

25. A system for facilitating computer text retrieval comprising:

means for selecting subdivisions for the text;

means for generating for each of said subdivision which is to be recovered at least one annotation containing words having a annotator determined selected relationship and being in a language selected from the group of a natural language and an artificial language;

means for storing the annotations in a predetermined structured form which retains said selected relationship, the stored annotations being readable by a computer to search for desired annotations; and means for adding to stored annotations a connection to corresponding text.

26. A system as claimed in claim 25 wherein said generating means includes means for generating said annotations in said structured form.

27. A system as claimed in claim 25 wherein said generating means includes means for generating said annotations in a natural language; and wherein said means for storing includes means for translating the annotations in natural language to said predetermined structured form.

28. As system as claimed in claim 25 wherein said generating means includes means for generating annotations at least semiautomatically.

29. A system as claimed in claim 28 wherein the semiautomatic generating means includes means for detecting similarities between a current text subdivision to be annotated and previously annotated subdivisions, and means for utilizing previous annotations from subdivisions having predetermined detected similarities to the current text subdivision to annotate the current text subdivision.

30. A system as claimed in claim 29 wherein the detected similarities are key words.

31. A system as claimed in claim 29 wherein said utilizing means includes means for suitably modifying the previous annotations.

32. A system as claimed in claim 29 wherein said utilizing means includes means for proposing the previous annotations, and means for selecting one or more of the proposed annotations which are suitable for use with the current text subdivision.

33. A system as claimed in claim 28 including means for forming a database of annotation groups from existing annotated subdivisions; and
wherein said semiautomatic generating means includes means for searching said database for an annotation which is similar to a selected annotation for a current text to be annotated, and means for utilizing other annotations in the annotation group containing the similar annotation to also annotate the current text subdivision.

34. A system as claimed in claim 33 wherein said means for forming a database includes means for storing annotations used, said means storing for each annotation a pointer to each group to which the annotation belongs.

35. A system as claimed in claim 33 wherein said utilizing means includes means for suitably modifying said other annotations.

36. A system as claimed in claim 33 wherein said utilizing means includes means for proposing the other annotations, and means for selecting one or more of the proposed annotations which are suitable for use with the current text subdivision.

37. A system as claimed in claim 28 including means for filtering annotations which are generated at least semiautomatically to utilize only generated annotations which are appropriate to the current text.

38. A system as claimed in claim 37 wherein said semiautomatic generating means includes means for utilizing prior stored annotations to annotate the current text; and
wherein the filtering means includes means for storing allowed object classes with annotations, and means for utilizing a prior annotation for the current text only if the allowed object class for such prior annotation corresponds in a predetermined way to an object for the current text.

39. A system as claimed in claim 38 wherein said utilizing means includes means for proposing prior stored annotations related in a predetermined way to the current text for use with the current text; and including means for noting object classes for proposed annotations which are not accepted, and means for using classes of rejected annotations to make allowed object classes more specific.

40. A system as claimed in claim 25 wherein said storing means includes means for storing with each annotation one or more pointers for text subdivisions to which the annotation is relevant.

41. A system as claimed in claim 25 including means for searching stored annotations to find relevant text subdivisions.

42. A system as claimed in claim 41 wherein said means for searching includes means for presenting a structured form search input, means for matching the structured form search input to the annotations stored during said storing step, and means for presenting text subdivisions connected to matching annotations found during said matching step.

43. A system as claimed in claim 41 wherein said means for searching includes means for presenting a natural language search input, means for translating the search input into said predetermined structured form, means for matching the structured form search input to the annotations stored during said storing step, and means for presenting text subdivisions connected to matching annotations found during said matching step.

44. A system as claimed in claim 25 including means for storing a standing query, and means for examining new stored annotations to determine correspondence to said standing query.

45. A method for retrieving relevant text subdivisions from a database where there are one or more annotations in structured form stored for and suitably connected to at least selected ones of said subdivisions, each of said annotations containing at least some words having a predetermined relationship selected by an annotator, the method comprising the steps of:
generating a search query in structured form having words with a selected relationship, matching the structured form search query with the stored annotations, and presenting text subdivisions connected to annotations matching the search query in both words and relationship which are found during said matching step.

46. A method as claimed in claim 45 wherein said generating step includes the steps of inputting a search query in natural language which contains words having said selected relationship, and translating the search query into said structured form.

47. A system for retrieving relevant text subdivisions from a database where there are one or more annotations in structured form stored for and suitably connected to at least selected ones of such subdivisions, each of said annotations containing at least some words having a predetermined relationship selected by an annotator, the system comprising:
means for generating a search query in structured form having words with a selected relationship, means for matching the structured form search query with the stored annotations, and means for presenting text subdivisions connected to annotations matching the search query in both word and relationship found during said matching step.

48. A system as claimed in claim 47 wherein said means for generating includes the means for inputting a search query in natural language which contains words having said selected relationship, and means for translating the search query into said structured form.

* * * * *